US009326212B2

(12) United States Patent  
Liu

(10) Patent No.: US 9,326,212 B2  
(45) Date of Patent: Apr. 26, 2016

(54) METHOD AND DEVICE FOR PROCESSING QOS PARAMETER IN SUBSCRIPTION SERVICE COMBINATION SCENARIO

(71) Applicant: HUAWEI TECHNOLOGIES CO., LTD., Shenzhen (CN)

(72) Inventor: Huiyong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 13/777,204

(22) Filed: Feb. 26, 2013

(65) Prior Publication Data

US 2013/0170473 A1 Jul. 4, 2013

Related U.S. Application Data

(63) Continuation of application No. PCT/CN2011/073108, filed on Apr. 21, 2011.

(30) Foreign Application Priority Data

Aug. 30, 2010 (CN) .......................... 2010 1 0270336

(51) Int. Cl.
*H04W 28/24* (2009.01)
*H04W 36/30* (2009.01)
(52) U.S. Cl.
CPC .............. *H04W 36/30* (2013.01); *H04W 28/24* (2013.01)
(58) Field of Classification Search
CPC ...... H04W 36/30; H04W 28/24; H04W 40/34
USPC .......... 370/330, 331, 230–235, 401; 455/436; 709/227
See application file for complete search history.

(56) References Cited

U.S. PATENT DOCUMENTS 8,064,382 B2 * 11/2011 Zisimopoulos et al. ...... 370/322
8,295,174 B2 * 10/2012 Wu et al. ....................... 370/233
8,358,602 B2 *  1/2013 Puthiyandyil et al. ........ 370/310
(Continued)

FOREIGN PATENT DOCUMENTS

CN      1736123 A     2/2006
CN    101438609 A     5/2009
CN    101925137 A    12/2010

OTHER PUBLICATIONS

PCT Written Opinion of the International Searching Authority mailed Aug. 4, 2011, issued in corresponding PCT Patent Application No. PCT/CN2011/073108.

(Continued)

*Primary Examiner* — Edan Orgad
*Assistant Examiner* — Emmanuel Maglo
(74) *Attorney, Agent, or Firm* — Staas & Halsey LLP

(57) ABSTRACT

The present invention provides a method and device for processing a QoS parameter in a subscription service combination scenario. The method includes: determining a subscribed APN corresponding to an alias APN, where the alias APN is obtained by a mobility management network element according to an APN in an access request of a UE and according to acquired correspondence between a subscribed APN and an alias APN of the UE; and determining a QoS parameter of the alias APN according to a QoS parameter of the subscribed APN. Embodiments of the present invention can provide a solution for processing a QoS parameter in subscription service combination.

9 Claims, 11 Drawing Sheets

(56) References Cited

U.S. PATENT DOCUMENTS

| | | | |
|---|---|---|---|
| 8,831,014 B2* | 9/2014 | Koodli et al. | 370/401 |
| 2007/0258465 A1 | 11/2007 | Ma et al. | |
| 2007/0293216 A1 | 12/2007 | Jiang | |
| 2009/0023426 A1 | 1/2009 | Shatzkamer et al. | |
| 2009/0086705 A1* | 4/2009 | Zisimopoulos et al. | 370/347 |
| 2009/0316656 A1* | 12/2009 | Zhao | H04W 28/22 370/331 |
| 2010/0027448 A1* | 2/2010 | Puthiyandyil et al. | 370/310 |
| 2011/0075675 A1* | 3/2011 | Koodli et al. | 370/401 |
| 2011/0080870 A1* | 4/2011 | Bhalla et al. | 370/328 |
| 2011/0171953 A1* | 7/2011 | Faccin | H04W 48/08 455/426.1 |
| 2011/0182268 A1* | 7/2011 | Akhtar | H04W 36/0022 370/331 |
| 2011/0235505 A1* | 9/2011 | Eswara et al. | 370/221 |
| 2012/0044805 A1* | 2/2012 | Lee et al. | 370/230 |
| 2012/0094629 A1* | 4/2012 | Liu | H04W 36/06 455/404.1 |
| 2012/0122491 A1* | 5/2012 | Kim et al. | 455/456.3 |
| 2012/0124220 A1* | 5/2012 | Zhou et al. | 709/227 |
| 2012/0213072 A1* | 8/2012 | Kotecha et al. | 370/235 |
| 2012/0246325 A1* | 9/2012 | Pancorbo Marcos et al. | 709/227 |
| 2014/0013383 A1* | 1/2014 | Pancorbo-Marcos et al. | 726/1 |
| 2014/0364121 A1* | 12/2014 | Zhao | H04W 28/22 455/436 |

OTHER PUBLICATIONS

International Search Report, dated Aug. 4, 2011, in corresponding International Application No. PCT/CN2011/073108 (4 pp.).
Extended European Search Report issued Aug. 14, 2013 in corresponding European Application No. 11780116.7.
"Two Type non-GBR AMBR and MBR QoS Mapping for I-RAT HO", 3GPP TSG SA WG2 Meeting #67, Aug. 25-29, 2008, pp. 1-3.

* cited by examiner

METHOD AND DEVICE FOR PROCESSING QOS PARAMETER IN SUBSCRIPTION SERVICE COMBINATION SCENARIO

CROSS-REFERENCE TO RELATED APPLICATIONS

This application is a continuation of International Application No. PCT/CN2011/073108, filed on Apr. 21, 2011, which claims priority to Chinese Patent Application No. 201010270336.1, filed on Aug. 30, 2010, both of which are hereby incorporated by reference in their entireties.

FIELD OF THE INVENTION

The present invention relates to mobile communications technologies, and in particular, to a method and device for processing a quality of service (Quality of Service, QoS) parameter in a subscription service combination scenario.

BACKGROUND OF THE INVENTION

In order to enhance the competitiveness of future networks, the $3^{rd}$ Generation Partnership Project ($3^{rd}$ Generation Partnership Project, 3GPP) provides a brand-new evolved network, which is named a system architecture evolution (System Architecture Evolution, SAE) system. The SAE system includes: an evolved universal mobile telecommunication system (Universal Mobile Telecommunication System, UMTS) terrestrial radio access network (Evolved UMTS Terrestrial Radio Access Network, EUTRAN), which is used to implement all radio-related functions of the evolved network; a mobility management entity (Mobility Management Entity, MME), which is responsible for mobility management of a control plane, including user context management and mobility state management as well as assignment of a temporary user identity; a serving gateway entity (Serving Gateway, SGW), which is a user plane anchor point between 3GPP access systems, and terminates an interface of the EUTRAN; a packet data gateway entity (PDN Gateway, PGW), which is a user plane anchor point between a 3GPP access system and a non-3GPP access system, and terminates an interface with an external packet data network (Packet Data Network, PDN); a policy and charging rule function entity (Policy and Charging Rule Function, PCRF), which is used to implement functions of policy control decision and flow based charging control; and a home subscriber server (HSS, Home Subscriber Server), which is used to store subscription information of a user.

For a QoS parameter of the network, an access point name aggregate maximum bit rate (Access Point Name Aggregate Maximum Bit Rate, APN-AMBR) parameter is introduced in the SAE. All non guaranteed bit rate (Non Guaranteed Bit Rate, Non-GBR) bearers of the same APN share an APN-AMBR, which is used to perform traffic control for all the Non-GBR bearers established by the APN. The PGW implements traffic control of uplink and downlink APN-AMBR, and a user equipment (User Equipment, UE) implements traffic control of the uplink APN-AMBRs.

With the development of network operation, services of operators may need to be adjusted. For example, multiple similar APN services are adjusted to provide service for a specific PGW, that is, multiple similar APN services need to be mapped to an APN corresponding to a specific PGW. The operators, due to service acquisition or merger, may also have a need of mapping multiple similar APN services of users to a specific APN.

After subscribed users are combined, multiple APN services of the users may be mapped to one alias APN. However, after multiple APN services are mapped to one alias APN, a QoS parameter of the alias APN cannot be determined.

SUMMARY OF THE INVENTION

Embodiments of the present invention provide a method and device for processing a QoS parameter in a subscription service combination scenario, to implement processing of a QoS parameter of an alias APN in the subscription service combination scenario.

An embodiment of the present invention provides a method for processing a QoS parameter in a subscription service combination scenario, including:

determining a subscribed APN corresponding to an alias access point name APN, where the alias APN is obtained by a mobility management network element according to an APN in an access request of a UE and according to acquired correspondence between a subscribed APN and an alias APN of the UE; and determining a QoS parameter of the alias APN according to a QoS parameter of the subscribed APN.

An embodiment of the present invention provides a device for processing a QoS parameter in a subscription service combination scenario, including:

an acquisition module, configured to determine a subscribed APN corresponding to an alias access point name APN, where the alias APN is obtained by a mobility management network element according to an APN in an access request of a UE and according to acquired correspondence between a subscribed APN and an alias APN of the UE; and a determination module, configured to determine a QoS parameter of the alias APN according to a QoS parameter of the subscribed APN.

In the method provided by the embodiment of the present invention, a QoS parameter of an alias APN is obtained according to a QoS parameter of a subscribed APN corresponding to the alias APN or the QoS parameter of the alias APN is statically configured, thereby implementing processing of the QoS parameter of the alias APN in the subscription service combination scenario.

BRIEF DESCRIPTION OF THE DRAWINGS

To describe the technical solutions in the embodiments of the present invention more clearly, the following briefly introduces accompanying drawings for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF THE EMBODIMENTS

To make objectives, technical solutions, and advantages of embodiments of the present invention clearer, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
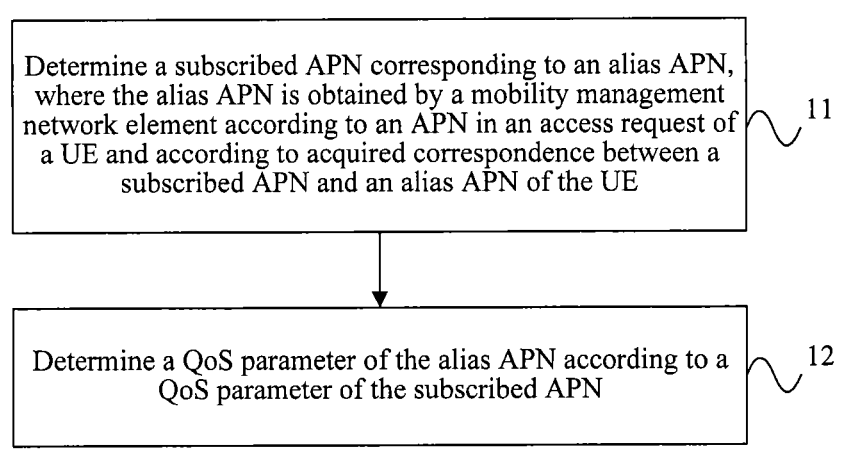
FIG. 1 is a schematic flow chart of a method according to a first embodiment of the present invention.

FIG. 1 is a schematic flow chart of a method according to a first embodiment of the present invention. The method includes:

Step 11: Determine a subscribed APN corresponding to an alias APN, where the alias APN is obtained by a mobility management network element according to an APN in an access request of a UE and according to acquired correspondence between a subscribed APN and an alias APN of the UE.

Step 12: Determine a QoS parameter of the alias APN according to a QoS parameter of the subscribed APN.

The QoS parameter may specifically be an APN-AMBR.

In the embodiment of the present invention, the mobility management network element may be an MME, and may also be a serving GPRS support node (Serving GPRS Support Node, SGSN).

In one aspect, in an example where the QoS parameter is an APN-AMBR, four schemes shown in Table 1 may be adopted for determining the QoS parameter of the alias APN according to the QoS parameter of the subscribed APN.

TABLE 1

| Serial number | Scheme key point |
| --- | --- |
| Scheme 1 | An APN-AMBR of an alias APN is an accumulated value of APN-AMBRs of already activated subscribed APNs corresponding to the alias APN |
| Scheme 2 | An APN-AMBR of an alias APN is a maximum value of APN-AMBRs of already activated subscribed APNs corresponding to the alias APN |

TABLE 1-continued

| Serial number | Scheme key point |
| --- | --- |
| Scheme 3 | An APN-AMBR of an alias APN is an accumulated value of APN-AMBRs of all subscribed APNs corresponding to the alias APN |
| Scheme 4 | An APN-AMBR of an alias APN is a maximum value of APN-AMBRs of all subscribed APNs corresponding to the alias APN |

It can be understood that, the four implementation schemes are just examples, and the embodiments of the present invention are not limited to the four implementations.

In addition, the QoS parameter of the alias APN may also be statically configured. For example, a value of an APN-AMBR of an alias APN corresponding to a subscribed APN, for example, APN1, is statically configured to APN-AMBR1. Then, when APN1 is activated, after alias APN mapping (mapping APN1 to the alias APN corresponding to APN1), a value of the APN-AMBR of the alias APN corresponding to APN1 is determined as APN-AMBR1.

In another aspect, an executor of the foregoing steps may be an MME, an SGW/PGW or a PCRF.

In still another aspect, the foregoing steps may be executed in an Attach procedure or a UE Request PDN Connectivity procedure.

Reference may be made to the following embodiments for the foregoing corresponding situations.

In this embodiment, a QoS parameter of an alias APN is obtained according to a QoS parameter of a subscribed APN corresponding to the alias APN or the QoS parameter of the alias APN is statically configured, thereby implementing processing of the QoS parameter of the alias APN in the subscription service combination scenario.

Figure 2:
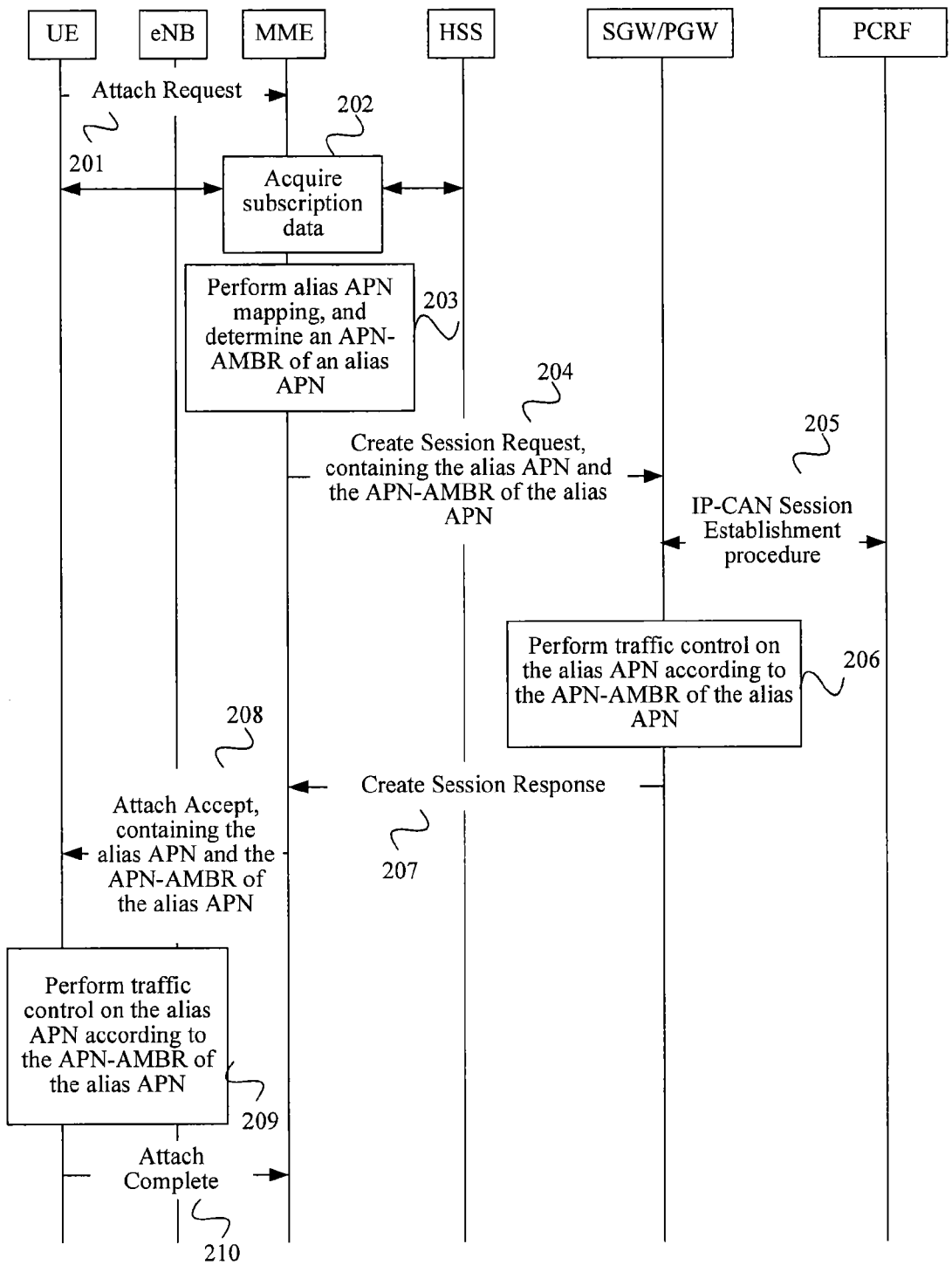
FIG. 2 is a schematic flow chart of a method according to a second embodiment of the present invention.

FIG. 2 is a schematic flow chart of a method according to a second embodiment of the present invention. An example where an executor is an MME and the method is executed in an attach (attach) procedure is used in this embodiment. Referring to FIG. 2, this embodiment includes:

Step 201: A user equipment (User Equipment, UE) sends an attach request (Attach Request) message to an MME through an evolved base station (eNB), where the Attach Request message includes an APN of the UE.

Step 202: The MME performs authentication with the UE and an HSS, to acquire subscription data.

Correspondence between a subscribed APN and an alias APN of the UE may be configured in the HSS and saved in the HSS as a part of the subscription data. There may be one or more subscribed APNs of the UE, and there may also be one or more alias APNs corresponding to the subscribed APNs of the UE.

The subscription data acquired by the MME from the HSS includes a subscribed APN corresponding to the UE and correspondence between the subscribed APN and an alias APN. When an APN-AMBR of the subscribed APN is adopted to determine an APN-AMBR of the alias APN, the APN-AMBR of the subscribed APN needs to be acquired.

Step 203: The MME performs alias mapping, and determines an APN-AMBR of the alias APN.

According to the APN in the received attach request and according to the acquired correspondence between the subscribed APN and the alias APN, the MME determines the alias APN corresponding to the APN in the attach request. For example, when the attach request message sent by the UE to the eNB contains APN1, and an alias APN corresponding to APN1 in the subscription data acquired when the MME performs authentication is an Alias APN, the MME maps APN1 to the Alias APN.

When a QoS parameter of the subscribed APN is adopted to determine a QoS parameter of the alias APN, one of the four schemes shown in Table 1 may be adopted for implementation. That the alias APN is an Alias APN and subscribed APNs corresponding to the alias APN are APN1, APN2, . . . , and APNn is taken as an example.

Figure 3:
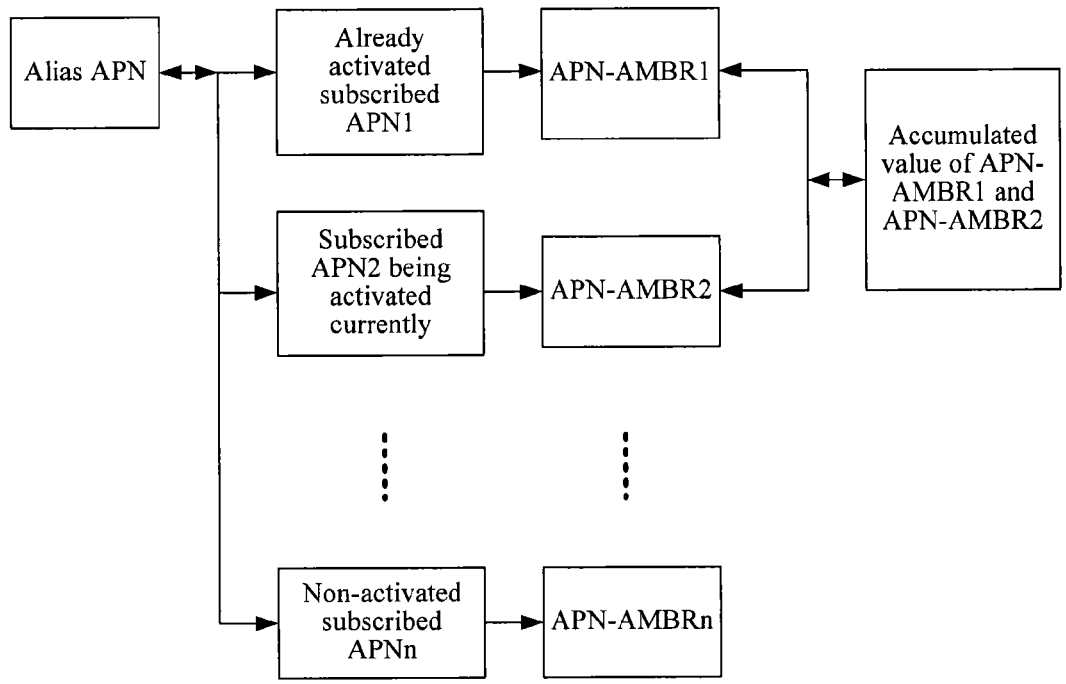
FIG. 3 is a schematic diagram of implementation scheme 1 for determining a QoS parameter of an alias APN according to an embodiment of the present invention.

Specifically, for scheme 1, referring to FIG. 3, FIG. 3 is a schematic diagram of implementation scheme 1 for determining a QoS parameter of an alias APN according to an embodiment of the present invention. In a service procedure, an APN-AMBR corresponding to the alias APN is an accumulated value of subscribed APN-AMBRs of an already activated subscribed APN and an APN being activated currently. In the service procedure, the value of the APN-AMBR corresponding to the alias APN gradually increases along with the increase of activated subscribed APNs.

Figure 4:
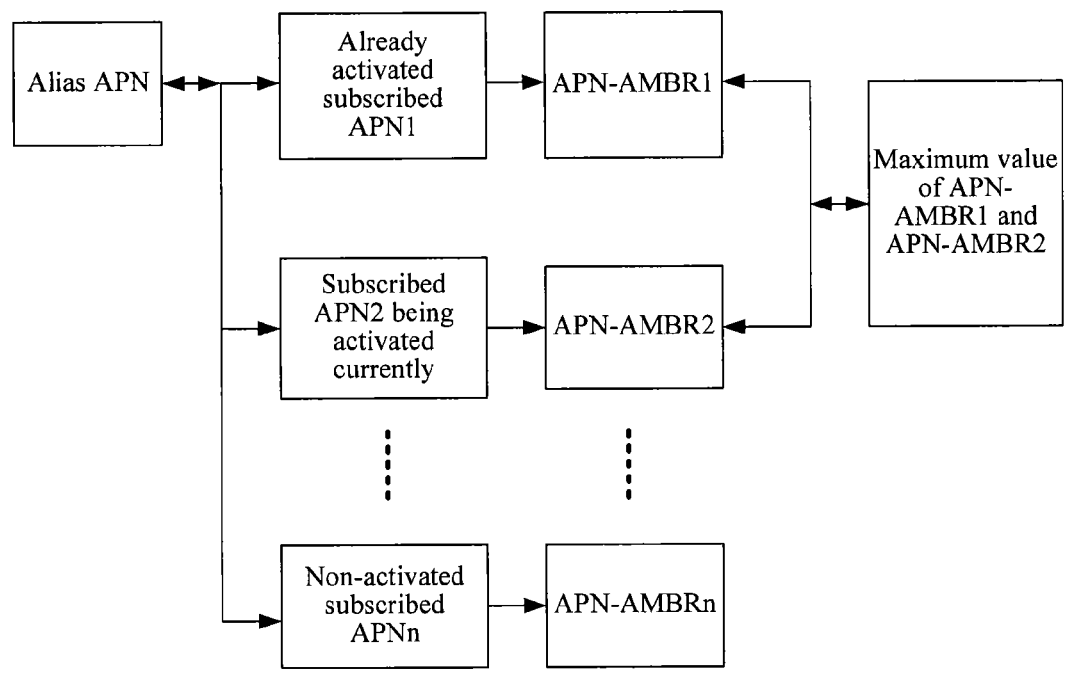
FIG. 4 is a schematic diagram of implementation scheme 2 for determining a QoS parameter of an alias APN according to an embodiment of the present invention.

For scheme 2, referring to FIG. 4, FIG. 4 is a schematic diagram of implementation scheme 2 for determining a QoS parameter of an alias APN according to an embodiment of the present invention. In a service procedure, an APN-AMBR corresponding to the alias APN is a maximum value of APN-AMBRs of an already activated subscribed APN and an APN being activated currently. In the service procedure, the value of the APN-AMBR corresponding to the alias APN may be changed along with the increase of the activated subscribed APNs.

Figure 5:
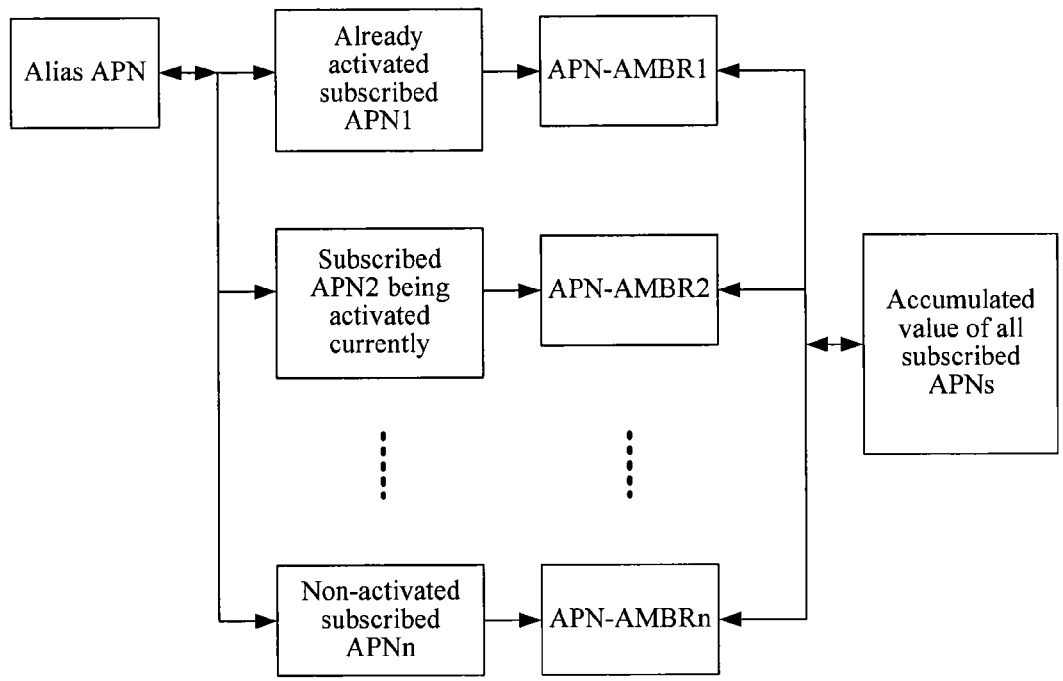
FIG. 5 is a schematic diagram of implementation scheme 3 for determining a QoS parameter of an alias APN according to an embodiment of the present invention.

For scheme 3, referring to FIG. 5, FIG. 5 is a schematic diagram of implementation scheme 3 for determining a QoS parameter of an alias APN according to an embodiment of the present invention. In a service procedure, an APN-AMBR corresponding to the alias APN is an accumulated value of APN-AMBRs of all corresponding subscribed APNs in alias APN mapping, and remains unchanged in the service procedure.

Figure 6:
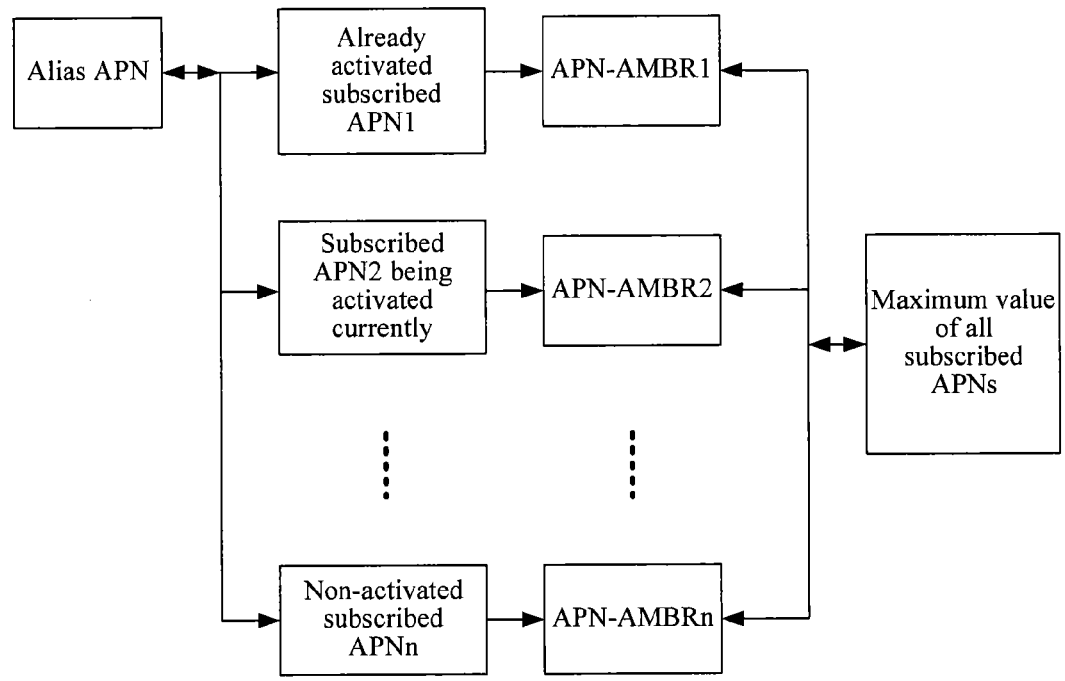
FIG. 6 is a schematic diagram of implementation scheme 4 for determining a QoS parameter of an alias APN according to an embodiment of the present invention.

For scheme 4, referring to FIG. 6, FIG. 6 is a schematic diagram of implementation scheme 4 for determining a QoS parameter of an alias APN according to an embodiment of the present invention. In a service procedure, an APN-AMBR corresponding to the alias APN is a maximum value of APN-AMBRs of all corresponding subscribed APNs in alias APN mapping, and remains unchanged in the service procedure.

In addition, a static configuration manner may also be adopted. For example, when APN1 is activated (APN1 may be carried in the attach request message, and may also be set in the subscription data of the UE by default), and the alias APN that corresponds to APN1 and is acquired from the HSS is the Alias APN, the value of the APN-AMBR of the Alias APN is directly configured to APN-AMBR1.

Step 204: The MME sends a create session request (Create Session Request) to an SGW/PGW, where the request contains the alias APN and the APN-AMBR of the alias APN.

The SGW/PGW corresponds to the alias APN, and is used to create an upstream bearer.

The value of the APN-AMBR of the alias APN may be obtained according to the APN-AMBR of the subscribed APN, and may also be obtained through static configuration.

Step 205: The SGW/PGW performs an IP-connectivity access network (IP-Connectivity Access Network, IP-CAN) session establishment procedure (IP-CAN Session Establishment procedure) with a PCRF.

Step 206: The SGW/PGW performs traffic control on the alias APN according to the APN-AMBR of the alias APN.

Step 207: The SGW/PGW returns a create session response (Create Session Response) message to the MME.

Step 208: The MME sends an attach accept (Attach Accept) message to the UE through an eNB, where the message contains the alias APN and the APN-AMBR of the alias APN.

Step 208 and steps 204-207 have a sequential relationship.

Step 209: The UE performs traffic control on the alias APN according to the APN-AMBR of the alias APN.

Step 210: The UE sends an attach complete (Attach Complete) message to the MME through the eNB, and completes creation of a downstream bearer.

In this embodiment, the MME determines an APN-AMBR parameter of an alias APN through an attach procedure, thereby guaranteeing the bandwidth of the alias APN, protecting benefits of a user, and facilitating service planning of an operator. Through implementation by the MME, effects on other network elements caused by characteristics of the alias APN may be reduced, and the operator may apply a local policy to perform QoS control on a bearer.

Figure 7:
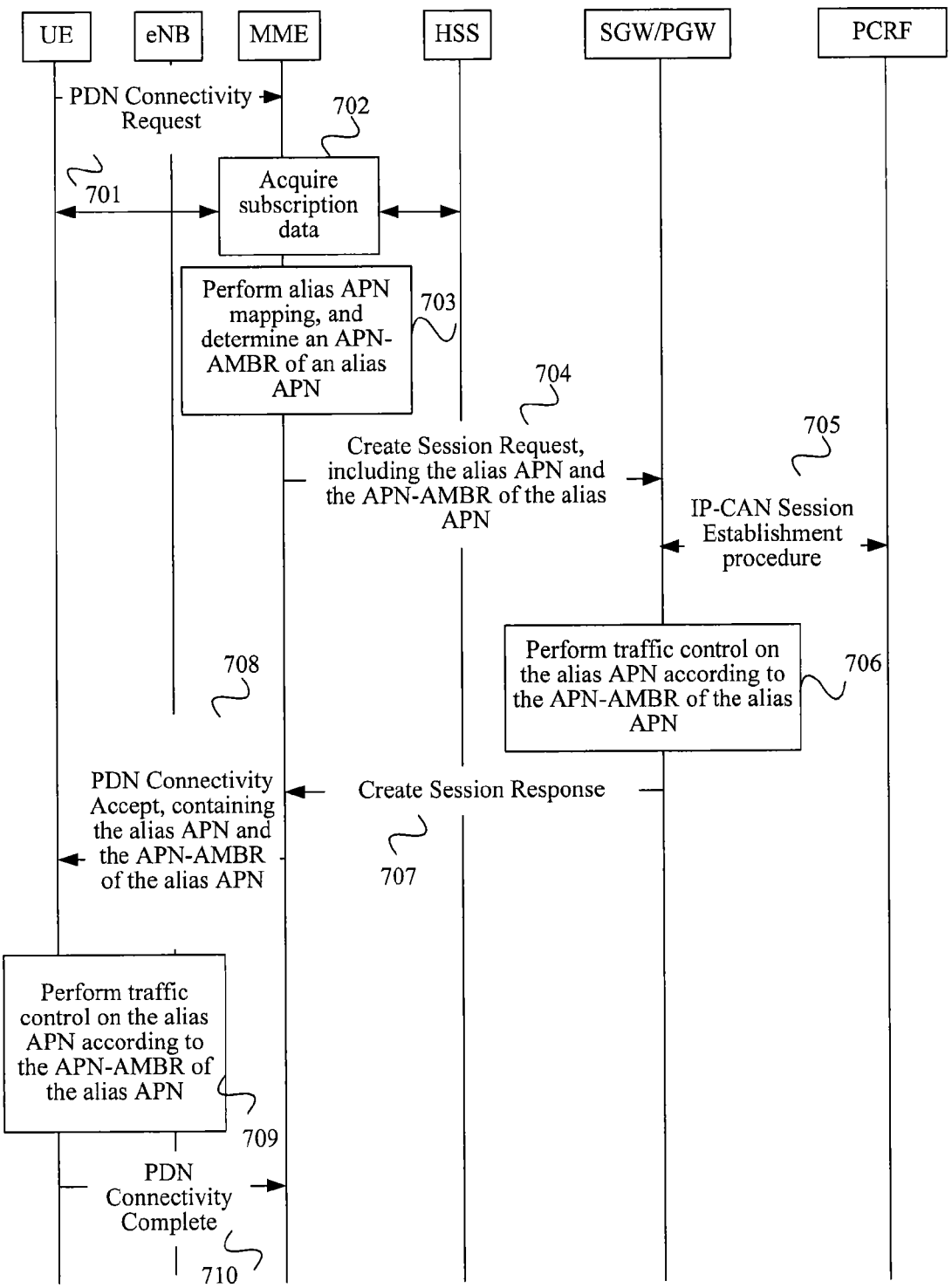
FIG. 7 is a schematic flow chart of a method according to a third embodiment of the present invention.

FIG. 7 is a schematic flow chart of a method according to a third embodiment of the present invention. An example where an executor is an MME and the method is executed in a UE request PDN connectivity (UE Request PDN Connectivity) procedure is used in this embodiment. Referring to FIG. 7, this embodiment includes:

Step 701: A UE sends a PDN connectivity request (PDN Connectivity Request) message to an MME through an eNB.

Step 702: The MME performs authentication with the UE and an HSS to acquire subscription data.

The subscription data includes an APN-AMBR of a subscribed APN corresponding to the UE, and correspondence between the subscribed APn and an alias APN.

Step 703: The MME performs alias mapping, and determines an APN-AMBR of the alias APN.

One of the four schemes shown in Table 1 may be adopted for implementation, where reference may be made to step 203 for details, which will not be described again.

Step 704: The MME sends a create session request (Create Session Request) to an SGW/PGW, where the request contains the alias APN and the APN-AMBR of the alias APN.

The SGW/PGW corresponds to the alias APN, and is used to create an upstream bearer.

Step 705: The SGW/PGW performs an IP-CAN Session Establishment procedure with a PCRF.

Step 706: The SGW/PGW performs traffic control on the alias APN according to a value of the APN-AMBR of the alias APN.

Step 707: The SGW/PGW returns a create session response (Create Session Response) message to the MME.

Step 708: The MME sends a PDN connectivity accept (PDN Connectivity Accept) message to the UE through the eNB, where the message contains the alias APN and the APN-AMBR of the alias APN.

Step 709: The UE performs traffic control on the alias APN according to the value of the APN-AMBR of the alias APN.

Step 710: The UE sends a PDN connectivity complete (PDN Connectivity Complete) message to the MME through the eNB, and completes creation of a downstream bearer.

In this embodiment, the determined APN-AMBR of the alias APN is obtained according to the APN-AMBR of the subscribed APN, and may also be obtained through static configuration, where reference may be made to the second embodiment for specific implementation.

In this embodiment, the MME determines an APN-AMBR parameter of an alias APN through a UE Request PDN Connectivity procedure, thereby guaranteeing the bandwidth of the alias APN, protecting benefits of a user, and facilitating service planning of an operator. Through implementation by the MME, effects on other network elements caused by characteristics of the alias APN may be reduced, and the operator may apply a local policy to perform QoS control on a bearer.

Figure 8:
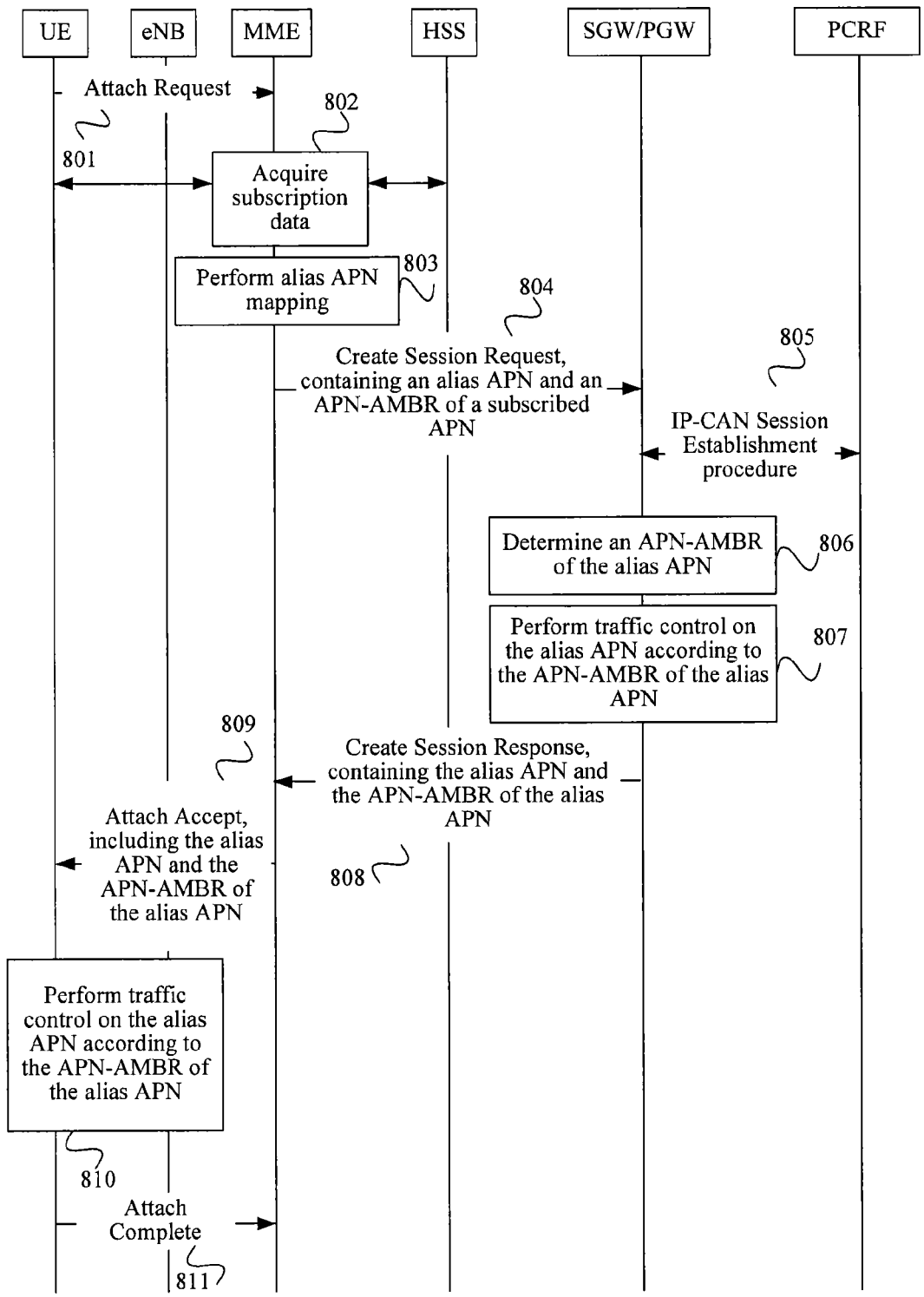
FIG. 8 is a schematic flow chart of a method according to a fourth embodiment of the present invention.

FIG. 8 is a schematic flow chart of a method according to a fourth embodiment of the present invention. An example where an executor is an SGW/PGW and the method is executed in an attach procedure is used in this embodiment. Referring to FIG. 8, this embodiment includes:

Step 801: A UE sends an attach request (Attach Request) message to an MME through an eNB.

Step 802: The MME performs authentication with the UE and an HSS to acquire subscription data.

The subscription data includes an APN-AMBR of a subscribed APN corresponding to the UE, and correspondence between the subscribed APn and an alias APN.

Step 803: The MME performs alias mapping, and acquires, according to the subscription data, the APN-AMBR of the subscribed APN corresponding to the alias APN.

Step 804: The MME sends a create session request (Create Session Request) to an SGW/PGW, where the request contains the alias APN and the APN-AMBR of the subscribed APN.

The SGW/PGW corresponds to the alias APN, and is used to create an upstream bearer.

If subscribed APNs are activated in turn, the APN-AMBR included in the Create Session Request is an APN-AMBR of an APN being activated currently.

Step 805: The SGW/PGW performs an IP-CAN Session Establishment procedure with a PCRF.

Step 806: The SGW/PGW determines an APN-AMBR of the alias APN.

One of the four schemes shown in Table 1 may be adopted for implementation. In addition, a difference from execution by the MME lies in that, during the execution by the MME, the APN-AMBR of the subscribed APN may be acquired from subscription data of the HSS, while during execution by the SGW/PGW, the APN-AMBR of the subscribed APN needs to be transmitted by the MME to the SGW/PGW, and because determination of a scheme needs to be performed according to an APN-AMBR of a subscribed APN being activated currently and an APN-AMBRs of another subscribed APN, each time an APN is activated, the SGW/PGW needs to save an APN-AMBR transmitted from the MME, so as to perform calculation on the alias APN.

For example, if a manner of an accumulated value of activated APNs is adopted, the SGW/PGW may accumulate the saved APN-AMBR and a currently transmitted APN-AMBR to obtain a current APN-AMBR of the alias APN.

Step 807: The SGW/PGW performs traffic control on the alias APN according to the APN-AMBR of the alias APN.

Step 808: The SGW/PGW returns a create session response (Create Session Response) message to the MME, where the message contains the alias APN and the APN-AMBR of the alias APN.

Step 809: The MME sends an attach accept (Attach Accept) message to the UE through the eNB, where the message contains the alias APN and the APN-AMBR of the alias APN.

Step 810: The UE performs traffic control on the alias APN according to a value of the APN-AMBR of the alias APN.

Step 811: The UE sends an attach complete (Attach Complete) message to the MME through the eNB, and completes creation of a downstream bearer.

In this embodiment, the determining the APN-AMBR of the alias APN is obtained according to the APN-AMBR of the subscribed APN, and may also be obtained through static configuration, where reference may be made to the second embodiment for specific implementation.

In this embodiment, the SGW/PGW determines an APN-AMBR parameter of an alias APN through an attach procedure, thereby guaranteeing the bandwidth of the alias APN, protecting benefits of a user, and facilitating service planning of an operator. During implementation by the SGW/PGW, the SGW/PGW may perform QoS policy decision in a centralized way without activating a PCC, thereby avoiding unauthorized changes of QoS in a roaming scenario.

Figure 9:
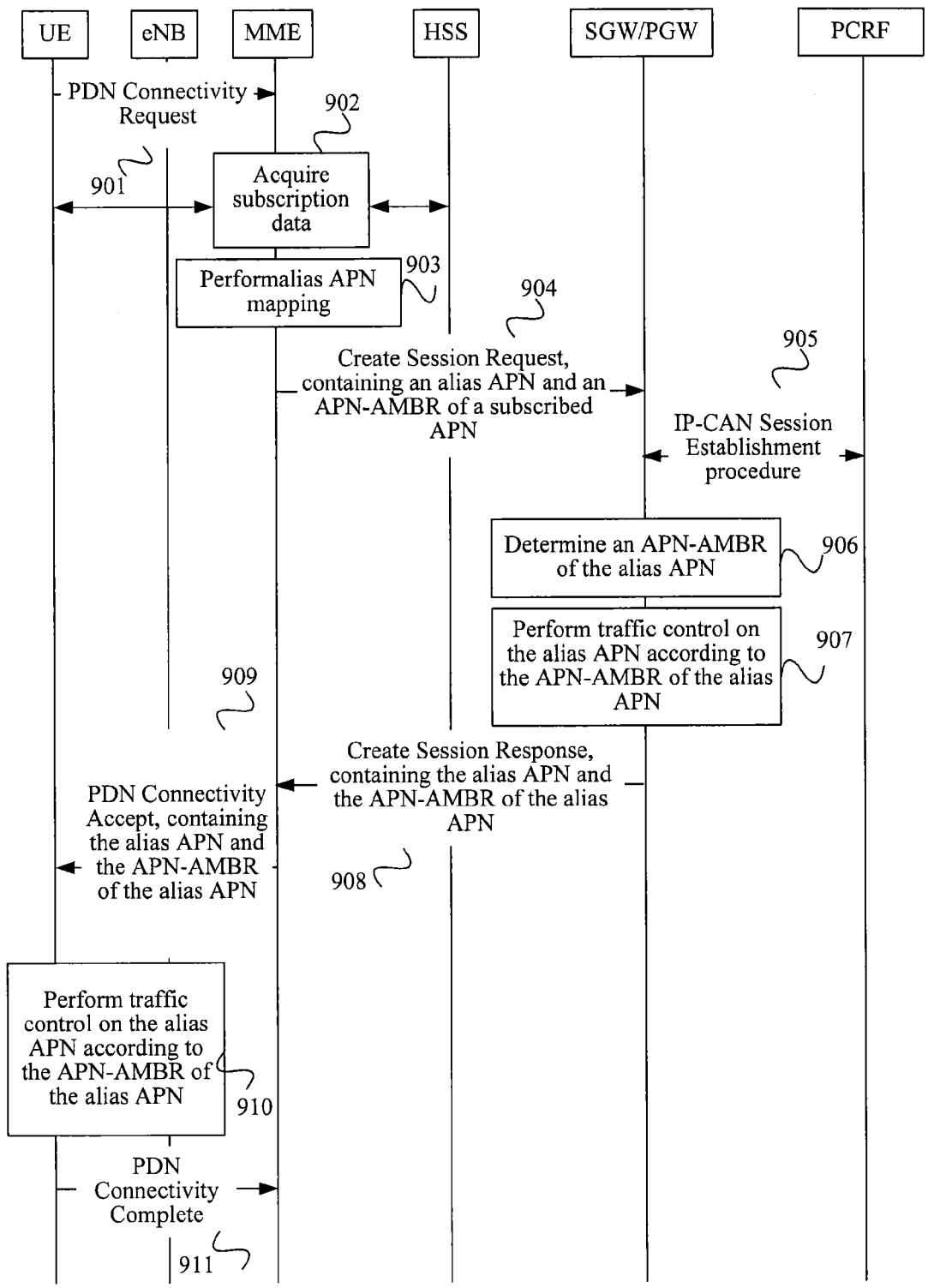
FIG. 9 is a schematic flow chart of a method according to a fifth embodiment of the present invention.

FIG. 9 is a schematic flow chart of a method according to a fifth embodiment of the present invention. An example where an executor is an SGW/PGW and the method is executed in a UE Request PDN Connectivity procedure is used in this embodiment. Referring to FIG. 9, this embodiment includes:

Step 901: A UE sends a PDN connectivity request (PDN Connectivity Request) message to an MME through an eNB.

Step 902: The MME performs authentication with the UE and an HSS to acquire subscription data.

The subscription data includes an APN-AMBR of a subscribed APN corresponding to the UE, and correspondence between the subscribed APn and an alias APN.

Step 903: The MME performs alias mapping, and acquires the APN-AMBR of the subscribed APN corresponding to the alias APN according to the subscription data.

Step 904: The MME sends a create session request (Create Session Request) to an SGW/PGW, where the request contains the alias APN and the APN-AMBR of the subscribed APN.

The SGW/PGW corresponds to the alias APN, and is used to create an upstream bearer.

If subscribed APNs are activated in turn, the APN-AMBR contained in the create session request is an APN-AMBR of an APN being activated currently.

Step 905: The SGW/PGW performs an IP-CAN Session Establishment procedure with a PCRF.

Step 906: The SGW/PGW determines an APN-AMBR of the alias APN.

One of the four schemes shown in Table 1 may be adopted for implementation, where reference may be made to step 806 for details.

Step 907: The SGW/PGW performs traffic control on the alias APN according to the APN-AMBR of the alias APN.

Step 908: The SGW/PGW returns a create session response (Create Session Response) message to the MME, where the message contains the alias APN and the APN-AMBR of the alias APN.

Step 909: The MME sends a PDN connectivity accept (PDN Connectivity Accept) message to the UE through the eNB, where the message contains the alias APN and the APN-AMBR of the alias APN.

Step 910: The UE performs traffic control on the alias APN according to a value of the APN-AMBR of the alias APN.

Step 911: The UE sends a PDN connectivity complete (PDN Connectivity Complete) message to the MME through the eNB, and completes creation of a downstream bearer.

In this embodiment, the determining the APN-AMBR of the alias APN is obtained according to the APN-AMBR of the subscribed APN, and may also be obtained through static configuration, where reference may be made to the second embodiment for specific implementation.

In this embodiment, the SGW/PGW determines an APN-AMBR parameter of an alias APN through a UE Request PDN Connectivity procedure, thereby guaranteeing the bandwidth of the alias APN, protecting benefits of a user, and facilitating service planning of an operator. During implementation by the SGW/PGW, the SGW/PGW may perform QoS policy decision in a centralized way without activating a PCC, thereby avoiding unauthorized changes of QoS in a roaming scenario.

Figure 10:
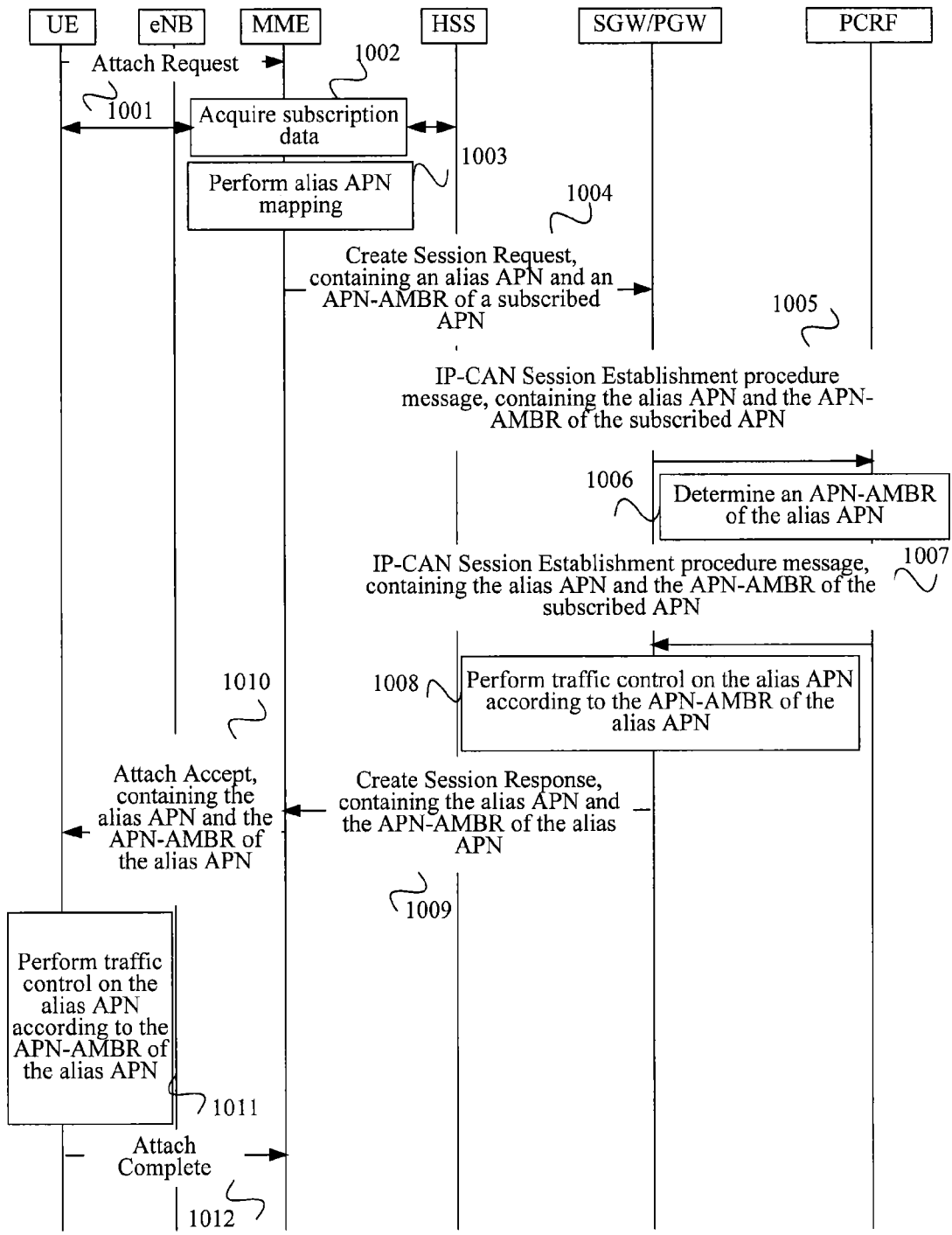
FIG. 10 is a schematic flow chart of a method according to a sixth embodiment of the present invention.

FIG. 10 is a schematic flow chart of a method according to a sixth embodiment of the present invention. An example where an executor is a PCRF and the method is executed in an attach procedure is used in this embodiment. Referring to FIG. 10, this embodiment includes:

Step 1001: A UE sends an attach request (Attach Request) message to an MME through an eNB.

Step 1002: The MME performs authentication with the UE and an HSS to acquire subscription data.

The subscription data includes an APN-AMBR of a subscribed APN corresponding to the UE, and correspondence between the subscribed APn and an alias APN.

Step 1003: The MME performs alias mapping, and acquires the APN-AMBR of the subscribed APN corresponding to the alias APN according to the subscription data.

Step 1004: The MME sends a create session request (Create Session Request) to a PGW, where the request contains the alias APN and the APN-AMBR of the subscribed APN.

The PGW corresponds to the alias APN, and is used to create an upstream bearer.

If subscribed APNs are activated in turn, the APN-AMBR contained in the create session request is an APN-AMBR of an APN being activated currently.

Step 1005: The PGW sends an IP-CAN session establishment procedure (IP-CAN Session Establishment procedure) message to a PCRF, where the message contains the alias APN and the APN-AMBR of the subscribed APN.

Step 1006: The PCRF determines an APN-AMBR of the alias APN.

One of the four schemes shown in Table 1 may be adopted for implementation. In addition, similar to execution by an SGW/PGW, an APN-AMBR transmitted from the MME through the SGW/PGW needs to be saved, so as to perform calculation on the alias APN.

For example, if a manner of an accumulated value of activated APNs is adopted, the PCRF may accumulate the saved APN-AMBR and a currently transmitted APN-AMBR to obtain a current APN-AMBR of the alias APN.

Step 1007: The PCRF sends an IP-CAN session establishment procedure (IP-CAN Session Establishment procedure) message to an SGW/PGW, where the message contains the alias APN and the APN-AMBR of the alias APN.

Step 1008: The SGW/PGW performs traffic control on the alias APN according to the APN-AMBR of the alias APN.

Step 1009: The SGW/PGW returns a create session response (Create Session Response) message to the MME, where the message contains the alias APN and the APN-AMBR of the alias APN.

Step 1010: The MME sends an attach accept (Attach Accept) message to the UE through the eNB, where the message contains the alias APN and the APN-AMBR of the alias APN.

Step 1011: The UE performs traffic control on the alias APN according to a value of the APN-AMBR of the alias APN.

Step 1012: The UE sends an attach complete (Attach Complete) message to the MME through the eNB, and completes creation of a downstream bearer.

In this embodiment, the determining the APN-AMBR of the alias APN is obtained according to the APN-AMBR of the subscribed APN, and may also be obtained through static configuration, where reference may be made to the second embodiment for specific implementation.

In this embodiment, the PCRF determines an APN-AMBR parameter of an alias APN through an attach procedure, thereby guaranteeing the bandwidth of the alias APN, protecting benefits of a user, and facilitating service planning of an operator. During the implementation by the PCRF, the PCRF may perform QoS policy decision in a centralized way without activating a PCC, thereby avoiding unauthorized changes of QoS in a roaming scenario.

Figure 11:
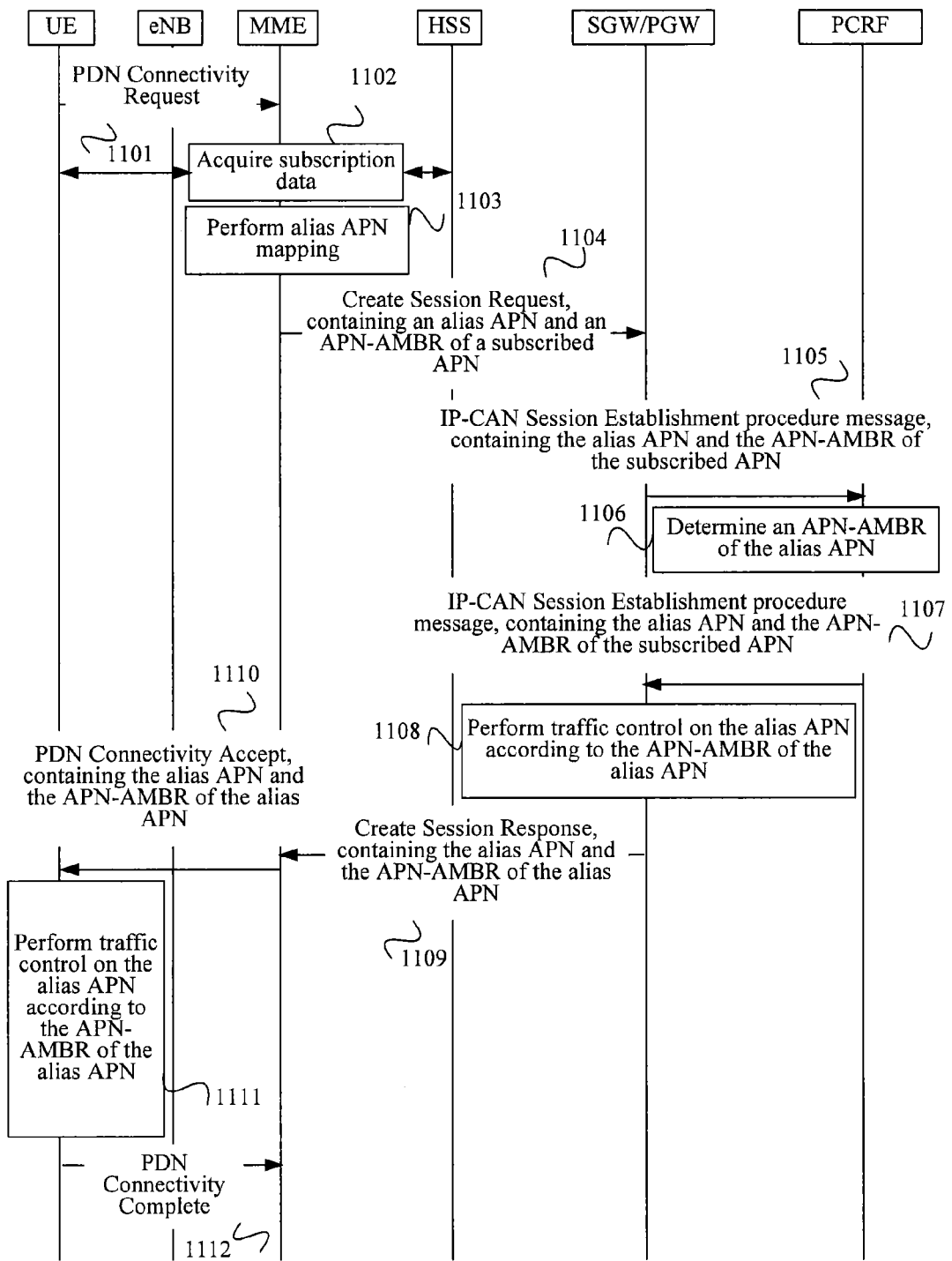
FIG. 11 is a schematic flow chart of a method according to a seventh embodiment of the present invention.

FIG. 11 is a schematic flow chart of a method according to a seventh embodiment of the present invention. An example where an execution subject is a PCRF and the method is executed in a UE Request PDN Connectivity procedure is used in this embodiment. Referring to FIG. 11, this embodiment includes:

Step 1101: A UE sends a PDN connectivity request (PDN Connectivity Request) message to an MME through an eNB.

Step 1102: The MME performs authentication with the UE and an HSS to acquire subscription data.

The subscription data includes an APN-AMBR of a subscribed APN corresponding to the UE, and correspondence between the subscribed APn and an alias APN.

Step 1103: The MME performs alias mapping, and acquires the APN-AMBR of the subscribed APN corresponding to the alias APN according to the subscription data.

Step 1104: The MME sends a create session request (Create Session Request) to an SGW/PGW, where the request contains the alias APN and the APN-AMBR of the subscribed APN.

The SGW/PGW corresponds to the alias APN, and is used to create an upstream bearer.

If subscribed APNs are activated in turn, the APN-AMBR included in the Create Session Request is an APN-AMBR of an APN being activated currently.

Step 1105: The SGW/PGW sends an IP-CAN session establishment procedure (IP-CAN Session Establishment procedure) message to a PCRF, where the message contains the alias APN and the APN-AMBR of the subscribed APN.

Step 1106: The PCRF determines an APN-AMBR of the alias APN.

One of the four schemes shown in Table 1 may be adopted for implementation. In addition, similar to execution by the SGW/PGW, the APN-AMBR transmitted from the MME through the SGW/PGW needs to be saved, so as to perform calculation on the alias APN.

For example, if a manner of an accumulated value of activated APNs is adopted, the PCRF may accumulate the saved APN-AMBR and a currently transmitted APN-AMBR to obtain a current APN-AMBR of the alias APN.

Step 1107: The PCRF sends an IP-CAN session establishment procedure (IP-CAN Session Establishment procedure) message to the SGW/PGW, where the message contains the alias APN and the APN-AMBR of the alias APN.

Step 1108: The SGW/PGW performs traffic control on the alias APN according to the APN-AMBR of the alias APN.

Step 1109: The SGW/PGW returns a create session response (Create Session Response) message to the MME, where the message contains the alias APN and the APN-AMBR of the alias APN.

Step 1110: The MME sends a PDN connectivity accept (PDN Connectivity Accept) message to the UE through the eNB, where the message contains the alias APN and the APN-AMBR of the alias APN.

Step 1111: The UE performs traffic control on the alias APN according to a value of the APN-AMBR of the alias APN.

Step 1112: The UE sends a PDN connectivity complete (PDN Connectivity Complete) message to the MME through the eNB, and completes creation of a downstream bearer.

In this embodiment, the determining the APN-AMBR of the alias APN is obtained according to the APN-AMBR of the subscribed APN, and may also be obtained through static configuration, where reference may be made to the second embodiment for specific implementation.

In this embodiment, the PCRF determines an APN-AMBR parameter of an alias APN through a UE Request PDN Connectivity procedure, thereby guaranteeing the bandwidth of the alias APN, protecting benefits of a user, and facilitating service planning of an operator. During implementation by the SGW/PGW, the SGW/PGW may perform QoS policy decision in a centralized way without activating a PCC, thereby avoiding unauthorized changes of QoS in a roaming scenario.

In the foregoing embodiments, four implementation schemes are provided for determining a QoS parameter of an alias APN. However, it can be understood that, the embodiments are not limited to the four implementation schemes, and other schemes may further be adopted for determining the QoS parameter of the alias APN, and after the QoS parameter of the alias APN is determined in other manners, the method may be executed still according to the foregoing interaction procedure.

Figure 12:
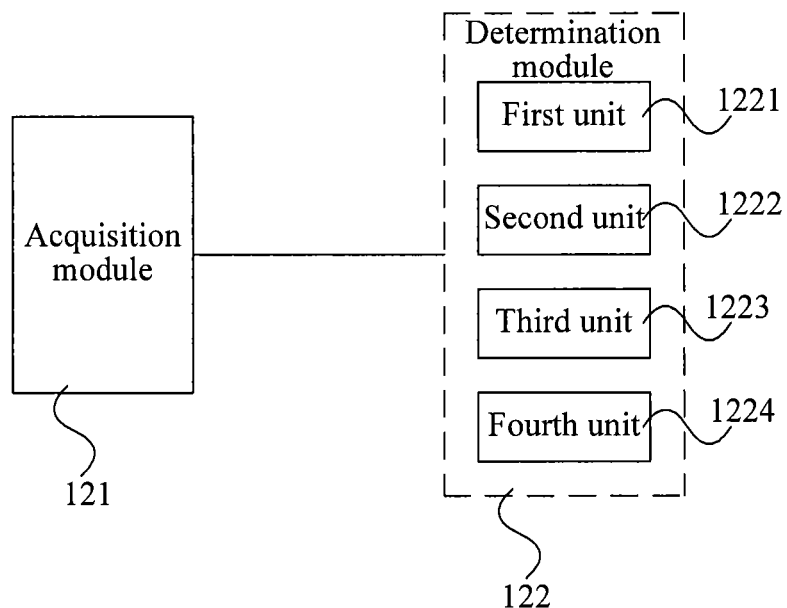
FIG. 12 is a schematic structural diagram of a device according to an eighth embodiment of the present invention.

FIG. 12 is a schematic structural diagram of a device according to an eighth embodiment of the present invention. The device includes an acquisition module 121 and a determination module 122. The acquisition module 121 is configured to determine a subscribed APN corresponding to an alias APN, where the alias APN is obtained by a mobility management network element according to an APN in an access request of a UE and according to acquired correspondence between a subscribed APN and an alias APN of the UE. The determination module 122 is configured to determine a QoS parameter of the alias APN according to a QoS parameter of the subscribed APN.

The determination module 122 may include a first unit 1221, a second unit 1222, a third unit 1223 and a fourth module 1224. The first unit 1221 is configured to use an accumulated value as the QoS parameter of the alias APN, where the accumulated value is an accumulated value of: a QoS parameter of a subscribed APN that is being activated currently and corresponds to the alias APN, and a QoS parameter of an already activated subscribed APN corresponding to the alias APN. The second unit 1222 is configured to use a maximum value as the QoS parameter of the alias APN, where the maximum value is a maximum value of: a QoS parameter of a subscribed APN that is being activated currently and corresponds to the alias APN, and a QoS parameter of an already activated subscribed APN corresponding to the alias APN. The third unit 1223 configured to use an accumulated value of QoS parameters of all subscribed APNs as the QoS parameter of the alias APN, where all the subscribed APNs correspond to the alias APN. The fourth unit 1224 is configured to use a maximum value of QoS parameters of all subscribed APNs as the QoS parameter of the alias APN, where all the subscribed APNs correspond to the alias APN.

In this embodiment, a QoS parameter of an alias APN is obtained according to a QoS parameter of a subscribed APN corresponding to the alias APN, which implements processing of the QoS parameter of the alias APN in a subscription service combination scenario.

Figure 13:
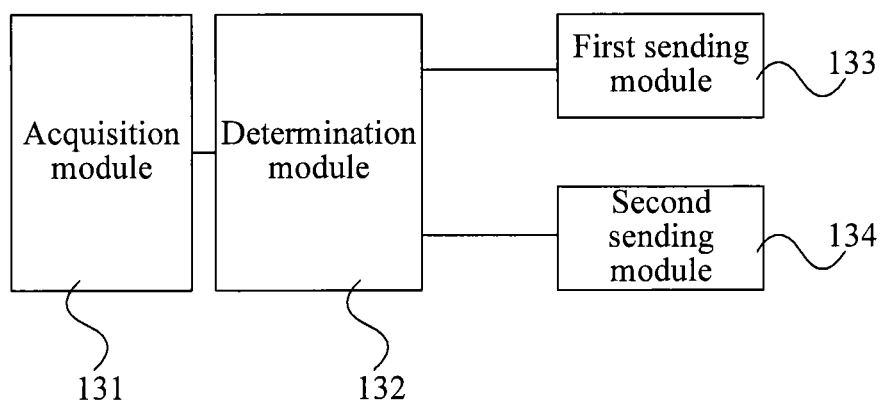
FIG. 13 is a schematic structural diagram of a device according to a ninth embodiment of the present invention.

FIG. 13 is a schematic structural diagram of a device according to a ninth embodiment of the present invention. The device described in this embodiment is an MME, including an acquisition module 131 and a determination module 132. The acquisition module 131 and the determination module 132 may be the determination module in FIG. 12. In addition, the device in this embodiment further includes a first sending module 133 and a second sending module 134. The first sending module 133 is configured to send a create session request to a serving gateway entity SGW or a packet data gateway entity PGW corresponding to the alias APN, where the create session request contains the alias APN and the QoS parameter of the alias APN. The second sending module 134 is configured to send the alias APN and the QoS parameter of the alias APN to the UE. In addition, the acquisition module 131 may be specifically configured to acquire the QoS parameter of the subscribed APN from an HSS.

In this embodiment, the MME determines an APN-AMBR parameter of an alias APN, thereby guaranteeing the bandwidth of the alias APN, protecting benefits of a user, and facilitating service planning of an operator.

Figure 14:
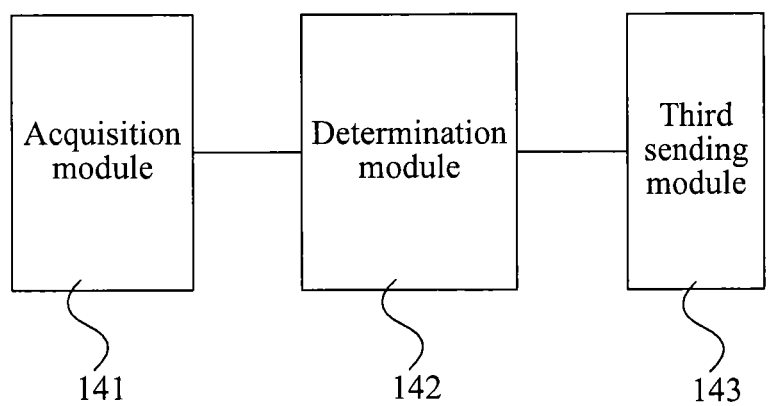
FIG. 14 is a schematic structural diagram of a device according to a tenth embodiment of the present invention.

FIG. 14 is a schematic structural diagram of a device according to a tenth embodiment of the present invention. The device described in this embodiment is an SGW or a PGW, including an acquisition module 141 and a determination module 142. The acquisition module 141 and the determination module 142 may be the determination module in FIG. 12. In addition, the device in this embodiment further includes a third sending module 143. The third sending module 143 is configured to send the alias APN and the QoS parameter of the alias APN to the mobility management network element through a create session response message, and the mobility management network element sends the alias APN and the QoS parameter of the alias APN to the UE. In addition, the acquisition module 141 may be specifically configured to acquire the QoS parameter of the subscribed APN from a create session request sent by the MME.

In this embodiment, the SGW/PGW determines an APN-AMBR parameter of an alias APN, thereby guaranteeing the bandwidth of the alias APN, protecting benefits of a user, and facilitating service planning of an operator.

Figure 15:
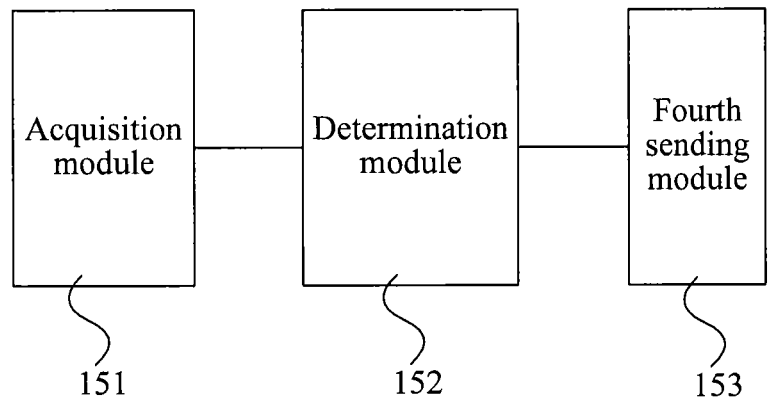
FIG. 15 is a schematic structural diagram of a device according to an eleventh embodiment of the present invention.

FIG. 15 is a schematic structural diagram of a device according to an eleventh embodiment of the present invention. The device in this embodiment is a PCRF, including an acquisition module 151 and a determination module 152. The acquisition module 151 and the determination module 152 may be the determination module in FIG. 12. In addition, the device in this embodiment further includes a fourth sending module 153. The fourth sending module 153 is configured to send the alias APN and the QoS parameter of the alias APN to an SGW or a PGW through an IP-connectivity access network IP-CAN session establishment procedure message, so that the SGW or PGW sends the alias APN and the QoS parameter of the alias APN to the mobility management network element through a create session response message, and the mobility management network element sends the alias APN and the QoS parameter of the alias APN to the UE. In addition, the acquisition module 151 may be specifically configured to acquire the QoS parameter of the subscribed APN from the IP-CAN Session Establishment procedure message sent by the SGW/PGW.

In this embodiment, the PCRF determines an APN-AMBR parameter of an alias APN, thereby guaranteeing the bandwidth of the alias APN, protecting benefits of a user, and facilitating service planning of an operator.

Persons of ordinary skill in the art may understand that all or part of the steps in the foregoing method embodiments may be implemented by a program instructing relevant hardware. The program may be stored in a computer readable storage medium. When the program runs, the steps of the foregoing method embodiments are performed. The storage medium include various media capable of storing program codes, such as a ROM, a RAM, a magnetic disk, or an optical disk.

Finally, it should be noted that the foregoing embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features of the technical solutions, without making essence of corresponding technical solutions depart from the spirit and scope of the technical solutions of the embodiments of the present invention.

What is claimed is:

1. A method for processing a quality of service (QoS) parameter, comprising:
   determining a subscribed access point name (APN) corresponding to an alias APN obtained by a mobility management network element according to an APN in an access request of a user equipment (UE) and determined correspondence between the subscribed APN and an alias APN of the UE, multiple services being associated with the alias APN; and
   determining, a QoS parameter of the alias APN in relation to one of multiple services associated with the alias APN, according to a QoS parameter of the subscribed APN, wherein the determining of the QoS parameter selects from among any one of:
      using an accumulated value as the QoS parameter of the alias APN, wherein the accumulated value is an accumulated value of: a QoS parameter of a subscribed APN that is being activated currently and corresponds to the alias APN, and a QoS parameter of an already activated subscribed APN corresponding to the alias APN;
      using a maximum value as the QoS parameter of the alias APN, wherein the maximum value is a maximum value of: a QoS parameter of a subscribed APN that is being activated currently and corresponds to the alias APN, and a QoS parameter of an already activated subscribed APN corresponding to the alias APN;
      using an accumulated value of QoS parameters of all subscribed APNs as the QoS parameter of the alias APN, wherein all the subscribed APNs correspond to the alias APN; and
      using a maximum value of QoS parameters of all subscribed APNs as the QoS parameter of the alias APN, wherein all the subscribed APNs correspond to the alias APN.

2. The method according to claim 1, wherein the QoS parameter comprises an access point name aggregate maximum bit rate (APN-AMBR).

3. The method according to claim 1, wherein when an executor of the method is the mobility management network element, the method further comprises:
   sending, by the mobility management network element, a create session request to a serving gateway entity (SGW) or a packet data gateway entity (PGW) corresponding to the alias APN, wherein the create session request contains the alias APN and the QoS parameter of the alias APN; and
   sending, by the mobility management network element, the alias APN and the QoS parameter of the alias APN to the UE.

4. The method according to claim 1, wherein when an executor of the method is an SGW or a PGW, the method further comprises:
   sending, by the SGW or PGW, the alias APN and the QoS parameter of the alias APN to the mobility management network element through a create session response message, wherein the mobility management network element sends the alias APN and the QoS parameter of the alias APN to the UE.

5. The method according to claim 1, wherein
   when an executor of the method is a policy and charging rule function entity (PCRF), the method further comprises:
   sending, by the PCRF, the alias APN and the QoS parameter of the alias APN to an SGW or a PGW through an IP-connectivity access network (IP-CAN) session establishment procedure message, so that the SGW or PGW sends the alias APN and the QoS parameter of the alias APN to the mobility management network element through a create session response message, and the mobility management network element sends the alias APN and the QoS parameter of the alias APN to the UE.

6. A device storing a program for executing the method for processing a quality of service (QoS) parameter according to claim 1.

7. The method according to claim 3, further comprising:
   acquiring, by the mobility management network element, the QoS parameter of the subscribed APN from a home subscriber server (HSS).

8. The method according to claim 4, further comprising:
   acquiring, by the SGW or PGW, the QoS parameter of the subscribed APN from a create session request sent by the mobility management network element.

9. The method according to claim 5, further comprising:
   acquiring, by the PCRF, the QoS parameter of the subscribed APN from the IP-CAN session establishment procedure message sent by the SGW or PGW.

* * * * *